United States Patent
Taylor

(10) Patent No.: US 10,023,804 B2
(45) Date of Patent: *Jul. 17, 2018

(54) SYSTEM AND PROCESS FOR CONVERTING WHOLE TIRES AND OTHER SOLID CARBON MATERIALS INTO RECLAIMABLE AND REUSABLE COMPONENTS

(71) Applicant: Fredrick Taylor, Rome, GA (US)

(72) Inventor: Fredrick Taylor, Rome, GA (US)

(*) Notice: Subject to any disclaimer, the term of this patent is extended or adjusted under 35 U.S.C. 154(b) by 813 days.

This patent is subject to a terminal disclaimer.

(21) Appl. No.: 13/738,173

(22) Filed: Jan. 10, 2013

(65) Prior Publication Data

US 2013/0189182 A1 Jul. 25, 2013

Related U.S. Application Data

(63) Continuation-in-part of application No. 13/348,128, filed on Jan. 11, 2012, now Pat. No. 9,200,162.

(Continued)

(51) Int. Cl.
*C10G 1/00* (2006.01)
*C10G 1/02* (2006.01)
(Continued)

(52) U.S. Cl.
CPC ............ *C10B 53/07* (2013.01); *C01B 31/02* (2013.01); *C09C 1/48* (2013.01); *C10B 47/30* (2013.01);
(Continued)

(58) Field of Classification Search
CPC ......... C10B 53/00; C10B 53/07; C10B 47/30; C10B 1/10; C10B 47/00; C10B 47/18;
(Continued)

(56) References Cited

U.S. PATENT DOCUMENTS 3,787,292 A 1/1974 Keappler
4,125,437 A 11/1978 Bacon
(Continued)

OTHER PUBLICATIONS

International Search Report and Written Opinion in International Application No. PCT/US13/20997 dated Mar. 12, 2013, 11 pages.
(Continued)

*Primary Examiner* — Jonathan Miller
*Assistant Examiner* — Jonathan Luke Pilcher
(74) *Attorney, Agent, or Firm* — Thomas | Horstemeyer, LLP

(57) ABSTRACT

A system and method of converting tires or other solid carbon based material is disclosed, including providing a chamber, feeding the solid carbon based material into the chamber, rotating the chamber, heating and reducing the material in the chamber, collecting solid residue from the chamber, collecting vapor from the chamber, and converting vapor collected from the chamber to a liquid. In an embodiment, the material includes a whole tire. The tire is heated in the chamber causing the tire to collapse and liquefy, exposing the metal in the tire which aids in grinding the carbon material in the tire as it tumbles, collecting solid residue, for example tire carbons, and collecting vapor, for example vaporized oil, and benzene and methane gas from the chamber and converting the oil. The chamber may be heated to a temperature from about 350° F. to about 1100° F. using gases reclaimed from the material.

22 Claims, 5 Drawing Sheets

Related U.S. Application Data

(60) Provisional application No. 61/733,998, filed on Dec. 6, 2012, provisional application No. 61/670,348, filed on Jul. 11, 2012.

(51) Int. Cl.

| | | |
|---|---|---|
| *C10G 1/10* | (2006.01) | |
| *C10B 1/10* | (2006.01) | |
| *C10B 47/00* | (2006.01) | |
| *C10B 47/18* | (2006.01) | |
| *C10B 47/30* | (2006.01) | |
| *C10B 53/00* | (2006.01) | |
| *C10B 53/07* | (2006.01) | |
| *C09C 1/48* | (2006.01) | |
| *C22B 7/00* | (2006.01) | |
| *C01B 31/02* | (2006.01) | |

(52) U.S. Cl.
CPC ............ *C10G 1/02* (2013.01); *C10G 1/10* (2013.01); *C22B 7/001* (2013.01); *C10B 1/10* (2013.01); *C10B 47/00* (2013.01); *C10B 47/18* (2013.01); *C10B 53/00* (2013.01); *C10G 1/00* (2013.01); *C10J 2300/0946* (2013.01); *Y02P 10/214* (2015.11); *Y02P 20/143* (2015.11)

(58) Field of Classification Search
CPC ..... C10G 1/00; C10G 1/10; C10G 1/02; C10J 2300/0946
See application file for complete search history.

(56) References Cited

U.S. PATENT DOCUMENTS

| | | | |
|---|---|---|---|
| 4,133,718 A | | 1/1979 | Jaquay |
| 4,563,246 A | | 1/1986 | Reed et al. |
| 4,983,278 A | | 1/1991 | Cha et al. |
| 5,057,189 A | | 10/1991 | Appfel |
| 5,078,836 A | | 1/1992 | Hogan |
| 5,095,040 A | | 3/1992 | Ledford |
| 5,258,101 A | | 11/1993 | Breu |
| 5,366,595 A | | 11/1994 | Padgett et al. |
| 5,425,792 A | * | 6/1995 | Bishop .................... C10J 3/002 252/373 |
| 5,507,927 A | * | 4/1996 | Emery .................... A62D 3/178 204/157.15 |
| 5,628,261 A | | 5/1997 | Beckstead et al. |
| 5,728,361 A | | 3/1998 | Holley |
| 5,821,396 A | | 10/1998 | Bouziane |
| 5,851,361 A | | 12/1998 | Hogan |
| 5,894,012 A | | 4/1999 | Denison |
| 5,989,019 A | | 11/1999 | Nishimura et al. |
| 6,011,187 A | | 1/2000 | Horizoe et al. |
| 6,133,491 A | | 10/2000 | Xing |
| 7,329,329 B2 | | 2/2008 | Masemore et al. |
| 7,931,783 B2 | | 4/2011 | Dam-Johansen et al. |
| 8,038,745 B2 | | 10/2011 | Pearson |
| 8,350,105 B2 | | 1/2013 | Taylor |
| 9,376,625 B2 | * | 6/2016 | Taylor .................... C09C 1/48 |
| 2002/0035804 A1 | | 3/2002 | Garcia-Secovia et al. |
| 2004/0025763 A1 | | 2/2004 | Kaneko |
| 2004/0261672 A1 | | 12/2004 | Nusimovich |
| 2006/0163053 A1 | | 7/2006 | Ershag |
| 2007/0000768 A1 | | 1/2007 | Cauley et al. |
| 2008/0286557 A1 | | 11/2008 | Tucker |
| 2009/0007484 A1 | | 1/2009 | Smith |
| 2009/0211892 A1 | | 8/2009 | Cunningham et al. |
| 2012/0010450 A1 | | 1/2012 | Taylor |
| 2012/0132733 A1 | | 5/2012 | Taylor |

OTHER PUBLICATIONS

International Search Report and Written Opinion in International Application No. PCT/US11/43359 dated Dec. 1, 2011, 10 pages.
Supplemental European Search Report of Application No. EP 13736250.5 dated Jul. 17, 2015, 8 pages.
European Search Report for European Patent Application No. 11804400.7 based on PCT/US2011/043559, dated Feb. 13, 2017.

* cited by examiner

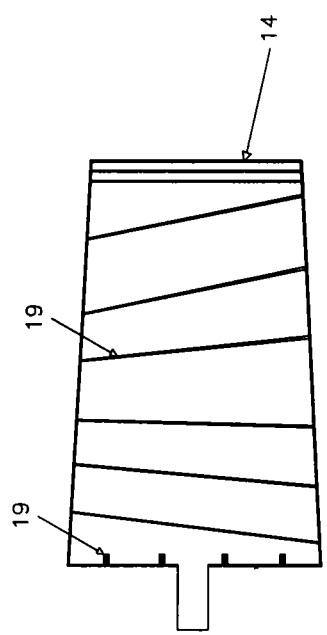
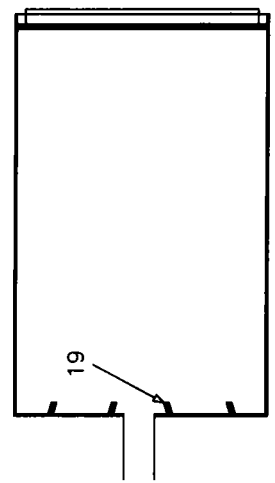

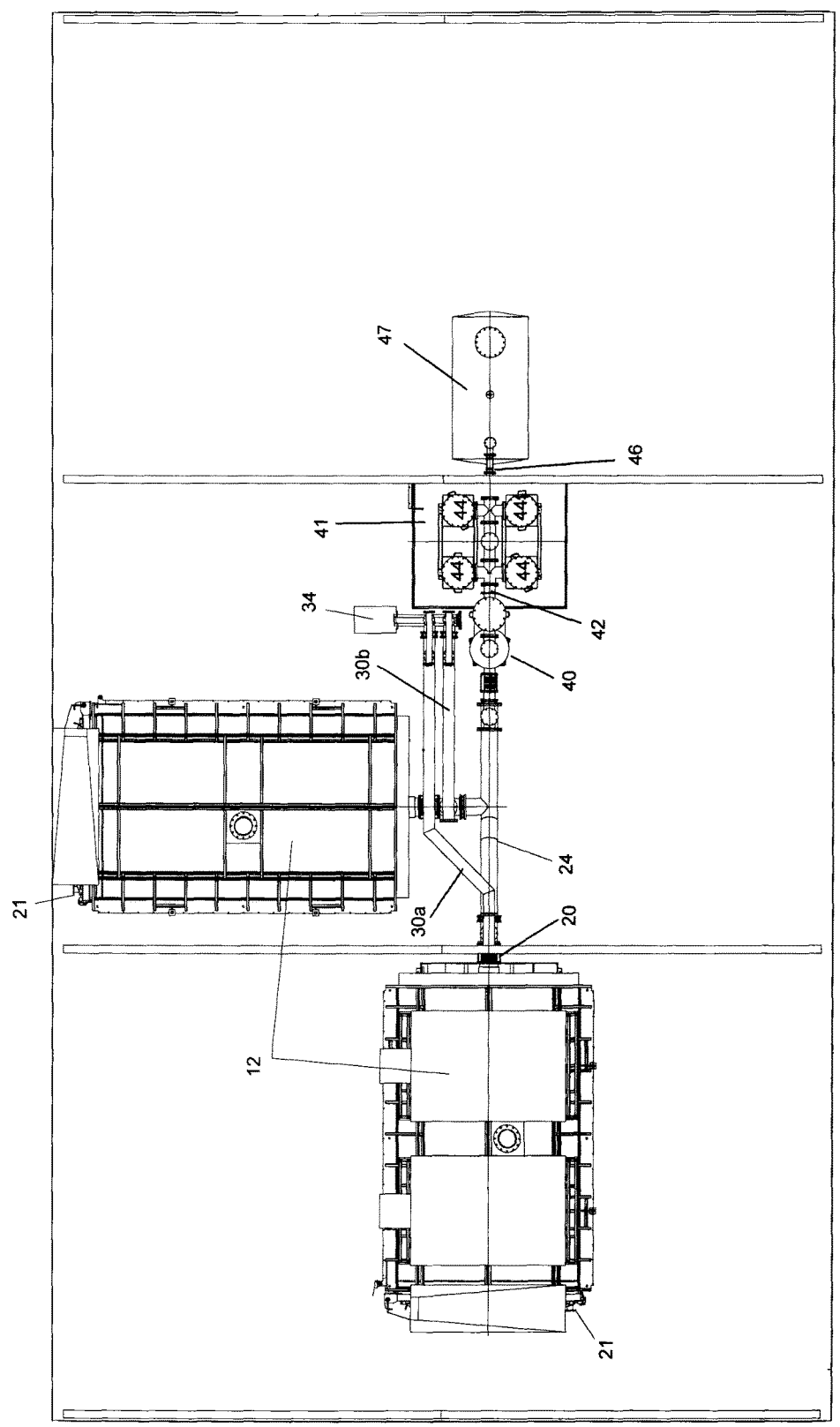

SYSTEM AND PROCESS FOR CONVERTING WHOLE TIRES AND OTHER SOLID CARBON MATERIALS INTO RECLAIMABLE AND REUSABLE COMPONENTS

CROSS-REFERENCE TO RELATED APPLICATION

This application claims the benefit of and priority to U.S. Provisional Patent Application No. 61/733,998 entitled "SYSTEM AND PROCESS FOR CONVERTING WHOLE TIRES AND OTHER SOLID CARBON MATERIALS INTO RECLAIMABLE AND REUSABLE COMPONENTS" filed on Dec. 6, 2012, U.S. Provisional Patent Application No. 61/670,348, entitled "HYBRID SYSTEM AND PROCESS FOR CONVERTING WHOLE TIRES AND OTHER SOLID CARBON MATERIALS INTO RECLAIMABLE AND REUSABLE COMPONENTS", filed on Jul. 11, 2012, and is a continuation-in-part of and claims the benefit of and priority to U.S. patent application Ser. No. 13/348,128 entitled "HYBRID SYSTEM AND PROCESS FOR CONVERTING WHOLE TIRES AND OTHER SOLID CARBON MATERIALS INTO RECLAIMABLE AND REUSABLE COMPONENTS", filed on Jan. 11, 2012, all of which are expressly incorporated by reference as if fully set forth herein in their entirety.

FIELD OF THE DISCLOSURE

The present disclosure relates to a unique system and process for converting whole tires and other solid carbon based materials into reclaimable and reusable components, such as one or more of syngas, oil, carbon black and steel without combustion of the carbon based materials.

BACKGROUND OF THE DISCLOSURE

Various methods are used to dispose of tires. For example, they can be simply ground up or mulched, or used for fuel referred to as tire derived fuel (TDF). Tires have been used as fuel in the cement industry in cement kilns, in boilers in pulp and paper mills, in power plants of electric utilities and in industrial boilers. When used for fuel the tires are typically first ground up or shredded and then placed in an incinerator at high temperatures, for example, above 1500° F., and incinerated as, for example, in US application publication no. US 2004/0025763.

There are a number of problems, however, with incinerating tires or using tires as fuel. One is the metal in the tires. The metal in the tires tends to clog feed systems in the pulp and paper industry. As a result, the pulp and paper industry needs to remove the metal, or de-wire the tires, before using them as fuel. Similarly, the tires must be de-wired and typically ground up before use by electric utilities. Also, when grinding the tires, tiny fines of metal from the steel bead ring in the tires and the steel belts in radial tires are left in the ground up material.

Other problems with incinerating tires for fuel involve environmental issues with air emissions that can include dioxins, furans, carbon monoxide, sulfur dioxide, hydrogen sulfide, nitrous oxides (NOx), carbon dioxide, and/or particulates. There can also be problems with disposal of resulting ash that can include metals and heavy metals from the tires, such as zinc, chromium, cadmium and lead.

Moreover, these methods of disposal also do not reclaim for reuse any of the various components of the tires. These components include the carbon solids, metal such as steel bead wire, heavy oils, light oils and syngas. In particular these methods do not reclaim these components for reuse in the manufacture of a new tire.

There is a need, therefore, for an improved system for not only disposal of used tires, but also for recovery of the tire components for reuse. Additionally, there is a need for more energy efficient disposal of tires and recovery of tire components for reuse, in particular for reuse in manufacturing a new tire.

SUMMARY OF THE DISCLOSURE

The hybrid system and method of the present disclosure overcomes the aforementioned disadvantages and results in recovering up to 8 times or more useable energy than it consumes to convert the tire or other solid carbon based materials into useable products and/or fuels. The present hybrid system and method are unique in the design of the machinery and in the process. In an exemplary embodiment the present system includes a chamber designed to receive and process solid carbon based material such as tires, in particular whole tires, in the existing form without pre-treatment. The material can be processed in the chamber as manufactured saving all the energy otherwise needed to pre-treat the material, for example tires, without shredding or cutting the material into smaller parts. Where the material comprises tires, the tires can range, for example, from lawn and garden size of 15 inches in diameter to large mining tires about nine feet in diameter.

In an embodiment the hybrid system and process includes a chamber and is designed to move the tires or other solid carbon based materials ("product") from a loading door at one end of the chamber, through which product is loaded into the chamber. As the product is heated the chamber is rotated so that the heat is indirectly applied to the product allowing the product to liquefy and vaporize. In an embodiment, rotation and indirect heating of the product causes a tumbling and roasting of the product in the chamber. The heating of the product can be carried out by heating one or more walls of the chamber to indirectly heat the material, for example by radiant heat from the one or more walls of the chamber. In an embodiment, the heating of the product in the chamber is conducted, at least in part, under vacuum.

Where the product is a tire, the tire collapses in the chamber as the tire is heated. Steel wire that is in the tire is exposed. The exposed steel wire assists in breaking down the tire and grinding the carbon from the tire into a powder. As the tire is heated in the chamber the tire rubber begins to liquefy and low temperature gases, such as methane, benzene and other low flash point gases, are emitted from the tire. These gases are captured in the process, for example by a vacuum system, and re-pressurized. Some or all of the re-pressurized gases, now for example the syngas, can be fed to the burner system, for example automatically fed via a gas train, to heat the chamber. One or more regulators can be used to regulate the supply of syngas and also to supplement the supply of syngas to the burner system with another fuel, such as natural gas, as needed. In an embodiment the recovered, re-pressurized gases used to heat the chamber have been subjected to a cooling step or process.

In an embodiment by capturing the gases, called syngas, from the chamber up to 85 percent of the energy required to convert the tires to the separate components of oil, carbon black and steel is recovered from the tire or other solid carbon material introduced into the chamber. The system can be controlled by a computer software program designed to achieve this result in the conversion process.

In an embodiment of the present disclosure the system and process is designed to heat tires or other solid carbon based material to a desired temperature, for example about 350° F. to about 1100° F. This results in a number of benefits for the products produced from the reaction of the present system in addition to the collection of gases that can generate up to about 85 percent of the energy needed to convert the tires or other solid carbon based material, namely: 1) the oil that results is useable grade to make into gasoline, diesel, and other usable oil base products; 2) steel of a useful size can be recovered to be re-melted into new products; and 3) the carbon black recovered by the process is reusable to make new tires based on, for example, a mixture of about 20 to about 30 percent recovered carbon black to about 70 to 80 percent virgin carbon black. This is the first known result of recovering tire carbon black (also referred to as tire-derived carbon black) from tires as a re-useable carbon black material useful for the manufacture of new tires. In a further embodiment, the material in the chamber is heated to a temperature between about 400° F. to about 1050° F.

The present system and process offer a green initiative. They minimize the consumption of virgin energy by recovering gases and oils from the products introduced into the system and using the gases and/or oils to heat products subsequently introduced into the system. Also, the present system and process for converting tires or other solid carbon based material to the useable products of one or more of syngas oil, carbon black and steel generates only trace amounts of $CO_2$. The $CO_2$ generated in converting a passenger tire can be as low as 1/20th of a pound of $CO_2$. No other greenhouse gases are generated in the process. Furthermore, the steel bead wire of the tire and the radial carcass wire are as manufactured by the tire company. The wire is clean and ready to be processed into new steel. This can save up to 70 percent of the energy needed in making steel from pig iron and other products.

In an embodiment, the chamber of the present system has tapered, or conically shaped, side walls and has a rib system, such as spiral ribs on the inside of the side walls that help move the tires or other solid carbon based material to an end of the chamber to be collected. As the chamber is rotated the steel in the tires acts as a grinding material to break up the carbon black in the product into the useable sizes. The rotation of the tires while the tires are heated in an indirect method allows for the tires to be fluffed and allows the heat to penetrate the tire surface indirectly. This is the only known design or system that uses this method allowing the vapors of syngas and oil to escape quickly without too much direct heat resulting in deterioration of the materials. The structure of carbon black can be changed by direct heat that is too high. The present system can pull the carbon black up the side wall to ensure that the material does not receive direct heat that will result in deterioration of the carbon black.

In one or more of the embodiments described herein, a system is provided for converting solid carbon based material, including but not limited to for example whole tires, the system comprising: a) a rotatable chamber in which the material can be heated including an opening allowing the material to be introduced into an interior portion of the chamber and an outlet through which solids from material reduced in the chamber can be collected; b) a heater for indirectly heating the interior portion of the chamber, the heater designed to heat the interior portion of the chamber to a temperature between about 350° F. and about 1100° F., preferably between about 400° F. and about 1050° F., more preferably between about 500° F. and about 1000° F.; c) a vacuum system including a conduit that is connected to the outlet of the chamber through which solids from material reduced in the chamber are collected; and d) a vapor collection system coupled to the chamber to collect vapor emitted from material reduced in the chamber, the vapor collection system including a vapor collection chamber in communication with the interior portion of the chamber.

In any one or more of the embodiments of the system, the chamber can have a substantially circular wall which may or may not be tapered and opposed end panels, a feed inlet and an outlet, along with heating means for heating the interior of the chamber, and means for rotating the chamber, the chamber being designed to receive and process product, such as whole tires or other solid carbon based material, converting the product into vapor, oil and solid residue, for example, syngas, high grade oil, an carbon black and metal. The heating means can provide for indirect heating of the interior of the chamber. The interior of the circular wall of the chamber may, optionally, have an arrangement of inwardly projecting ribs.

In any or more of the embodiments described herein, the system is further provided with a solid residue collection chamber connected to the vacuum system. One or more condensers may be coupled to the vapor collection chamber for receiving vapor from the vapor collection chamber and for converting the vapor to a liquid, for example, heavy and/or light oil. One or more storage tanks may be included to store the liquid. The system may also include one or more scrubbers coupled to an outlet from the one or more condensers, a compressor for re-pressurizing the remaining vapor and converting the remaining vapor to syngas, and a holding tank for the syngas resulting from the compressor. The system may optionally further include a system for returning at least a portion of the vapor, for example syngas, to one or more heaters used to heat the chamber.

In an embodiment, the present method of converting solid carbon based material comprises the steps of providing a rotatable chamber in which the material can be heated, introducing the material into the chamber, indirectly heating the chamber, rotating the heated chamber with the material in the heated chamber to reduce the material, collecting low temperature gases or oil or both from the reduced material from the chamber, and collecting residual solids form the reduced material from the chamber, wherein the chamber is heated to a temperature between about 350° F. and about 1100° F., preferably between about 400° F. and about 1050° F., more preferably between about 500° F. and about 1000° F. The chamber can have an interior surface and the interior surface can optionally be provided with a rib system including one or more ribs to rotate the material in the chamber and aid in causing a tumbling of the material in the chamber.

In a further embodiment of the present method, the product material includes a tire. For example, the tire can be a solid whole tire introduced into the chamber without pre-treatment of the tire. A chamber is provided that can provide indirect heating of the tire, for example to a temperature between about 350° F. and about 1100° F. In another embodiment the chamber is heated to a temperature between about 400° F. and about 1050° F., preferably between about 500° F. and about 1000° F. The tire is indirectly heated in the chamber. For example one or more walls of the chamber can be heated. Radiant heat from one or more walls of the chamber heats tire causing it to liquefy in the chamber and be reduced to produce gases, oils and residual solids for collection. The collected gases can include one or more of methane, benzene and syngas. The collected residual solids can include carbon solids and/or metal from the tire. Heating and rotating the tire in the chamber can cause the tire to collapse and liquefy giving off the low temperature gases. As the tire liquefies steel in the tire can become exposed and aid in breaking down the tire and grinding carbon from the tire into a powder as the tire is tumbled inside the chamber. At least a portion of the low temperature gases, for example syngas, and/or oil can be collected and used to heat the chamber. The gases can provide up to 85% of the energy needed to heat the chamber and reduce a tire subsequently introduced into the chamber. The chamber can be operated under vacuum.

In a further embodiment, a method of converting a tire or other solid carbon based material is disclosed, wherein the method includes providing a chamber such as the aforementioned chamber, feeding a tire or other solid carbon based material or both into the chamber, indirectly heating the chamber, rotating the heated chamber and reducing the material in the heated chamber under vacuum, collecting solid residue from the chamber, collecting vapor from the chamber, and converting vapor collected from the chamber to a liquid. In any one or more embodiments, wherein the material includes tires, the method includes heating the chamber to a temperature from about 350° F. to about 1100° F. preferably about 400° F. to about 1050° F., more preferably about 400° F. to about 1000° F., collecting solid residue, for example, tire carbon and/or metal from the tire, such as carbon black, and collecting vapor, for example, vaporized oil, and benzene, methane gas and/or syngas from the chamber. If desired, the oil can be converted to, for example, No. 2 to No. 6 fuel oil.

Where the material fed into the chamber includes a tire, the residual solids collected from the reduced tire from the chamber can include carbon solids, such as carbon black, that retain their tensile strength. The carbon solids can be mixed with virgin carbon black, for example in the ratio described above, to form a mixture for use in producing tires.

Other systems, devices, features, and advantages of the disclosed system will be or become apparent to one of skill in the art upon examination of the following drawings and detailed description. It is intended that all such additional systems, devices, features, and advantages be included within this description, be within the scope of the present invention, and be provided by the accompanying claims.

BRIEF DESCRIPTION OF THE DRAWINGS

Many aspects of the system and method of converting material, in particular tires and other solid carbon based material, of the present disclosure can be better understood with reference to the attached drawings, FIGS. 1-3. The components of the drawings are not necessarily to scale, emphasis instead being placed on clearly illustrating the principles of the present system and method. Moreover, in the drawings, like reference numerals designate corresponding parts throughout the several views.

FIGS. 2A-C illustrate another exemplary embodiment of a chamber of the present disclosure.

FIG. 3 illustrates a unique system layout for carrying out one method of the present disclosure, including one or more chambers.

DESCRIPTION OF THE EXEMPLARY EMBODIMENTS

Figure 1A:
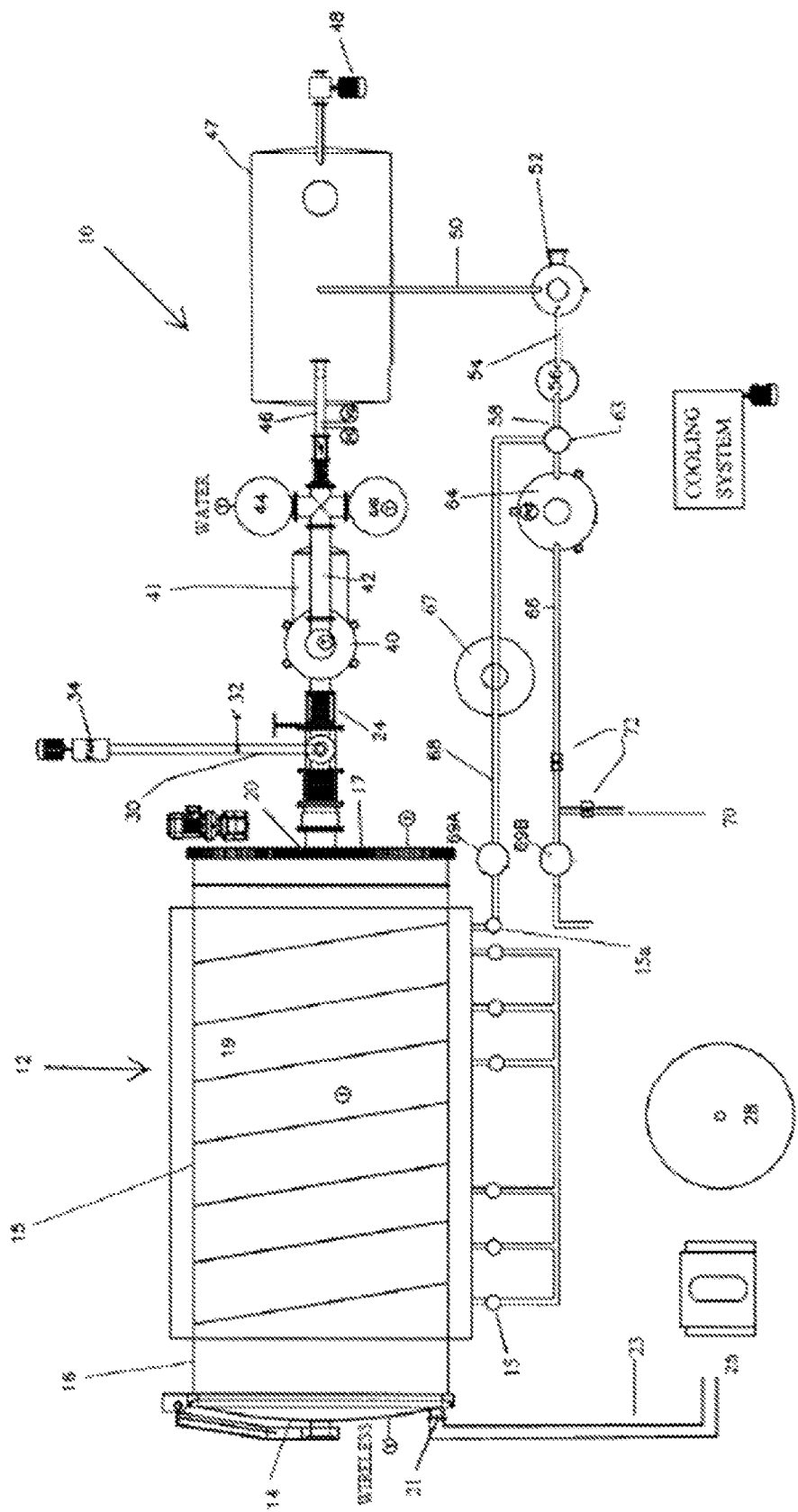
FIGS. 1A-1C illustrate an exemplary system layout for carrying out a method of the present disclosure including an exemplary chamber.
Figure 1B:
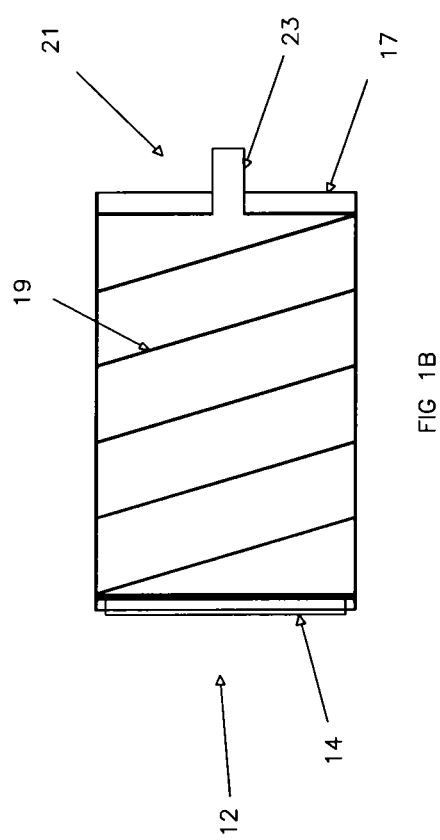
Figure 1C:
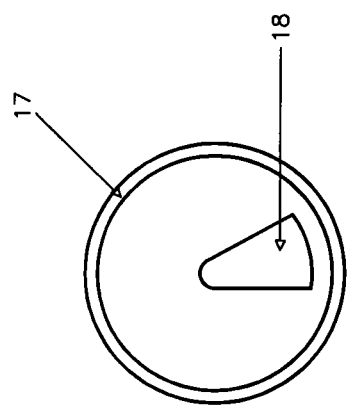

Referring more specifically to the drawings in which like reference numerals refer to like elements throughout the several views, an exemplary non-limiting embodiment of the system and method of converting material, in particular tires and other solid carbon based material, of the present disclosure is illustrated in FIGS. 1A-C. The system 10 includes a gasifier chamber 12, typically insulated, for converting material, in particular, tires and other solid carbon based material. In any one or more embodiments the gasifier chamber 12 is a rotary chamber having opposed end panels, one end panel having a feed inlet 14, such as a door, allowing for the introduction of the material into the chamber 12. The chamber 12 can include one or more heaters or burners 15, for example low-nox gas heaters, for heating and converting the material. The one or more heaters 15 can be used to heat one or more of the walls 16 of chamber 12 allowing the one or more walls 16 to heat the material indirectly by heat radiating from the interior surface(s) of the walls 16 towards the interior of the chamber 12.

Chamber 12 includes an outlet 21 for removing material from the chamber 12 resulting from the heating of the material in the chamber and rotation of the chamber. In one embodiment the system includes a vacuum system 25 including a vacuum line 23 connected to outlet 21 for removing solid materials from the chamber 12. Outlet 21 may be in one or the other end panel of the chamber 12 or in a side wall. The gasifier chamber 12 may have a vane and collection chute 18 associated with the chamber outlet 21 for removing solids from the chamber in cooperation with vacuum line 23.

In any one or more embodiments, the gasifier chamber 12 is a cylindrical rotating chamber having a substantially circular wall 16 in cross-section. A motor and associated coupling means (not shown) are provided to rotate the chamber. The wall 16 may, but need not, be tapered having a larger diameter at one end panel than at an opposed end panel. The chamber may thus be tapered in order to push product to one end of the chamber for grinding and the reverse for unloading the chamber. The chamber, for example, can vary in size from 3 feet in diameter to 10 feet and can vary in length from 10 feet to 20 feet. The taper of the chamber can, for example be between a 1% and 10% rise. For example, the chamber 12 can have a larger diameter at one end of the chamber than at its opposite end thus forming a tapered rotary screw system that enables both the agitation and unloading systems for the chamber 12 and also the powderization of the carbon black in the material utilizing the scrap steel wire in the material, if present.

In an embodiment, the circular wall 16 may, but need not, include a plurality of ribs or vanes 19 mounted or attached to the interior surface of the circular wall 16 and projecting inwardly from the wall's interior surface. In an embodiment, the ribs or agitating vanes 19 may project inwardly anywhere from about ⅛ of an inch to about 3 inches in height. In an embodiment, the ribs 19 can be positioned in a helical manner, as illustrated, for example, in FIG. 1B. As illustrated in FIG. 1C, the discharge end panel of the chamber may include a vein and collection chute 18 for removing the carbon black from the chamber 12. The ribs 19 may be ½ inch ribs for grinding tire black char, cleaning steel bead wire and bundling tire belts of steel. The rotating gasifier chamber 12 with the agitating vanes 19 provides efficient vaporization of the tire material and powderizing of the carbon black in the tire material.

Figure 2C:
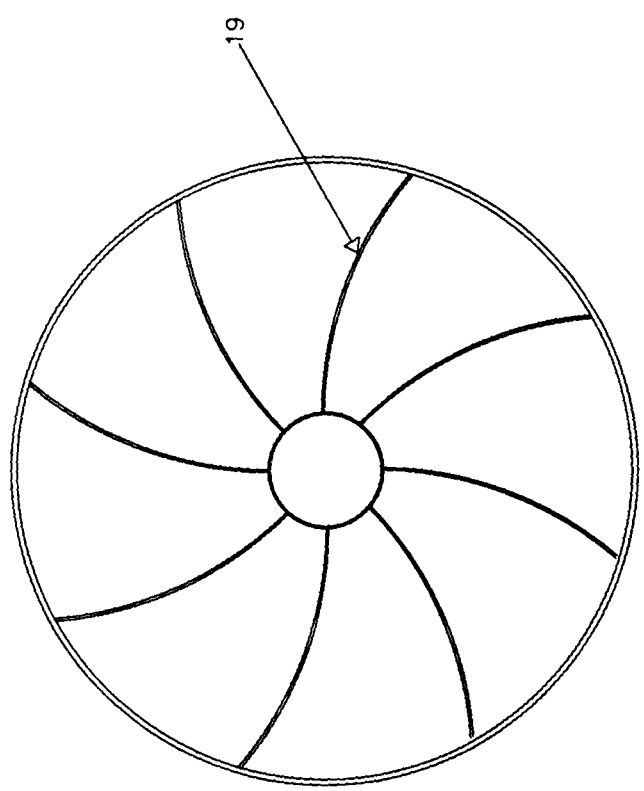

Optionally, the chamber 12 may further include ribs 19' mounted to the inside surface of the outlet end panel 17 of the chamber 12, as illustrated, for example, in FIGS. 2B and 2C. In an embodiment, the ribs 19' mounted to the interior surface of the outlet end panel 17 may project inwardly from the interior surface of the outlet panel either perpendicular to the interior surface of the panel, as illustrated, for example, in FIG. 2A, or at an angle to the interior surface of the outlet panel 17, as illustrated, for example, in FIG. 2B. In an embodiment, the ribs 19' may be angled in a manner such that they converge towards each other and towards the chamber outlet 21 and unloading vacuum line 23 for unloading and transferring carbon black from the chamber 12 to vacuum line 23. In yet another embodiment, the ribs 19' may have a nautilus-type configuration, as illustrated in FIG. 2C, to aid in grinding, for example, tire carbon, clean steel belts and bead wire.

Connected to the chamber outlet 21 is a conduit 23 which at one end directs solid materials resulting from the heating and grinding of the materials within the chamber 12 towards a collection chamber 28. An unloading valve (not shown) may be included to assist in periodically discharging solids, such as carbon black, from the collection chamber 28. Conduit 24 connected to outlet 20 directs off gases from the chamber 12 towards a vapor collection chamber 40.

Before the conduit 24 reaches vapor chamber 40, an exhaust conduit 30 having exhaust valve 32 may be included along with exhaust fan 34. In one embodiment this can allow the heating and reduction of the material in the chamber to occur under vacuum. In another embodiment vacuum to chamber 12 can be provided by vacuum system 25 connected by conduit 23 to chamber 12 at outlet 21. In an embodiment, the minimum vacuum in chamber 12 may be about 0.2 psi and the maximum vacuum may be about 0.5 psi.

In an embodiment gases from the chamber 12 may be collected, re-pressurized and returned to heater(s) 15 without subjecting the gases to a cooling step or process. In an embodiment, high temperature gases from the conversion of the material in chamber 12 can be temporarily collected in vapor chamber 40 where they may begin to cool. Vapor chamber 40 has an outlet having including outlet conduit 42 that leads to one or more condensing chambers 44, which have an outlet 46 leading to one or more collection tanks 47 and, for example, an overpressure safety valve 48. In one embodiment, the one or more condensers 44 may be water cooled to cool the gases exiting the chamber 12. Collection tank(s) 47 can be used to collect, for example, various oils. Vapor chamber 40 may include a second outlet (not shown) leading to a tank 41 for collecting oils not collected in tank(s) 47. The oils may include, for example, aromatic, olefinic and iso-parafinic hydrocarbons. Benzenes, naphthenes and toluenes may also be included. In an embodiment the lighter of the oils may be collected in tanks(s) 47 and the heavier of oils collected in tank 41. Tank 41 may optionally include a condenser for condensing and collecting heavy oils.

The one or more condensers 44 have an outlet including an outlet conduit 50 that may lead to one or more gas vapor scrubbers 52. An outlet conduit 54 can be provided for the one or more scrubbers 52 that lead to a compressor 56, to condenser outlet conduit 58 and ultimately to a holding tank 64. Included in the compressor outlet conduit 58 can be a gas vapor meter 62. An outlet conduit 66 can be provided for the holding tank 64 for holding, for example gas vapors. The intake to compressor 56 can also be used to draw vacuum on chamber 12 to provide heating and reduction of the material in chamber 12.

In the embodiment illustrated in FIG. 1A, compressor outlet conduit 58 leads to a valve 63, for example a three way valve, that can control flow of the compressed gas vapors exiting compressor 56 to either storage tank 64 for storing the compressed gas, for example, syngas and/or diverting some of the compressed gas to conduit 65 leading to a second storage tank 67 that can be used, for example, as a flare gas storage tank. Conduit 68 allows gas stored in tank 67 to be sent to regulator 69a and ultimately from regulator 69a to flare gas burner 15a which provides a unique system for removing non-flammable vapors from the process and monitoring the flammability of the vapors thus allowing a computer control system to instigate the use of these vapors to fire the burners 15.

A conduit 66 on the other hand allows gas, such as syngas, stored in tank 64 to be sent by way of regulator 69b ultimately to the burner system including one or more burners 15. In the embodiment illustrated in FIG. 1A six burners are illustrated. More burners or fewer burners can be employed, however. Additionally, conduit 70 provides an inlet for feed of alternate fuel, for example natural gas to conduit 66 ultimately to the burner system through regulator 69b. The alternate fuel can be used to supplement the gas from tank 64 to the burner system or in place of the gas from tank 64. Check valves 72 can be provided in the conduit lines 66 and 70 to ensure that the respective gases flow in the desired direction to the burner system.

FIG. 3 illustrates yet another embodiment of the present disclosure in which a plurality of chambers 12 can be coupled together in a system for converting carbon based materials, including whole tires, into reclaimable and reusable components as described above. In the embodiment illustrated in FIG. 3 two chambers are illustrated. Additional chambers, however, can be included. Each chamber 12 in this multi-chamber embodiment can be constructed and operated as described above. Each chamber includes an outlet for removal of solid materials, such as carbon black, as described above. Each chamber 12 also includes an outlet 20 connected to a conduit 24 for removing reclaimable vapor components and for delivering the components as described above in connection with a single chamber system for processing in a similar manner. For example, each chamber 12 may include an exhaust conduit 30a, b that may have an exhaust valve leading to an exhaust fan 34. Conduit 24 from each chamber 12 may be combined into a single conduit leading to vapor collection chamber 40 having an outlet conduit 42 leading to one or more condensing chambers (condensers) 44 and an outlet 46 connected to the one or more condensers 44. One or more collection tanks 41 and 47 may be included, as described above, for collecting various oils, such as light oils and heavy oils.

The multi chamber embodiment of FIG. 3 can be employed in a manner to continuously feed vapor chamber 40 and ultimately continuously produce various oils, such as light oils and heavy oils. For example, even though tires are processed in batch in each of the chambers 12, the processing of the tires in the various chambers may be sequenced in such a manner that there is always a flow of vapor from chambers 12 to vapor chamber 40.

In an exemplary embodiment, the method of converting material of the present disclosure involves converting tires and recovering, for example, syngas, carbon black, metal or steel, and oils from the tires. Whole tires may be introduced into the chamber 12 through feed door 14. The tires need not be ground up or pulverized before being placed in the chamber 12. Further, there is no need to de-wire the tires before placing them in chamber 12. For example, whole tires ranging from 4 inches in diameter to 120 inches in diameter can be placed into the chamber and processed by the present system and method.

In any one or more of the embodiments herein, a chamber is provided into which solid carbon based material, such as tires, can be introduced. The chamber is heated and rotated. The chamber may also be operated under vacuum, for example, in the range of about 0.2 to about 0.5 psi. This causes the tires or other solid carbon based material, or both, to be rotated by the chamber by the internal ribs 19, 19' of the chamber 12. In the case of tires, the ribs 19 lift the tires and allow them to fall over as they are lifted up the side wall of the chamber allowing for the heat from the surface of the chamber 12 to be delivered over and over, similar to a clothes dryer. This allows for continuous heat transfer to the tires and control of the surface temperature of the tires. In an embodiment of the process, rotating the tires up the side wall of the chamber 12 allows the tires to be evenly roasted, in particular the surface of the tires.

Further, controlling the temperature in the chamber 12 from about 350 to about 1100 degrees F., preferably from about 400° F. to about 1050° F., more preferably from about 500° F. to about 1000° F., allows the tire carcass to release gases as the tires collapse and liquefy, and allows the carbon black in the tires to be released without deterioration. The carbon black reclaimed from tires maintains its tensile strength, yield and necessary properties to be re-used in the manufacture of tires, making this process unique. For example, the reclaimed carbon black can have a grade of N200 to N700, including in particular N660.

The inside surface of the chamber 12 with ribs 19 that lift and rotate the tires has at least two unique advantages. In addition to lifting and rotating the tires and controlling the temperature of the tires, the steel wire in the tires can act as a grinding or impacting tool to aid in reducing the size of the tires, in particular their carbon products, to a fine grain powder. As the tires lose their shape and come apart the ribs and/or tapered wall of the chamber 12 move the material to one end of the chamber. Further, the now released bead wire of the tires and the ribs of the chamber reduce the size of the carbon black and clean the steel wire of remaining hydrocarbon materials from the steel.

In an embodiment, the circular wall 16 of chamber 12, as mentioned above, may be tapered such that its diameter narrows in the direction of the chamber outlet 21. Such a taper can assist in pushing the tires from the feed end 14 of the chamber 12 towards the outlet 21, as the chamber is rotated and as the tires are processed, to enhance the grinding of the tire carbon material into a fine powder.

In an embodiment, the ribs in the chamber 12 can also be tapered to push the material in the chamber towards the outlet 21 and for better grinding. In an embodiment, the present method can involve changing the direction of rotation of the chamber to the opposite direction to assist in grinding the tire material such that, for example, chamber 12 is rotated first in one direction and subsequently in the opposite direction to process the tires.

The conversion process carried out in chamber 12 can be a batch process in which one or more tires are placed in the chamber and processed. Tire carbon, for example carbon black, in the form of a fine powder is removed from chamber 12 through chamber outlet 21 into vacuum line 23 ultimately falling into collection chamber 28 and collected, for example in a bin or in super sacks. At the end of the process only the steel beads, and in the case of radial tires, the cord wire, may be left in the vessel or chamber 12. This metal can be subsequently removed and sold as scrap metal.

In the case of processing tires, the vapor exiting chamber 12 can include vapor in the form of vaporized oil and benzene and syngas, which vapor may be delivered by conduit 24 to vapor chamber 40 where the vapor is temporarily held. Also vapor exiting chamber 12 may be re-pressurized and returned to the heater(s) 15 for heating chamber 12. The vapor can exit vapor chamber 40 by way of conduit 42 and may be delivered to the one or more storage tank(s) 41 and/or one or more condensing chambers 44. In an embodiment, the condensing chambers can be water cooled to assist in the condensation of the vapor into a liquid, in particular oil. The oil that collects at the base of the one or more condensing chambers 44 may be removed by way of the condensing chamber outlet 46 and delivered to one or more collection tanks 47. As noted above tanks 41 and 47 may be used to collect various oils.

Remaining vapor may be delivered from the one or more condensing chambers 44 by way of conduit 50 to one or more gas scrubbers 52 where impurities can be removed. The cleaned vapor may then be delivered by way of conduit 54 to the compressor 56. In an embodiment, compressor 56 can re-pressurize the remaining vapor up to about 40 psi, allowing conventional burners to use the vapor or compressed gas for heating the chamber 12. The re-pressurized vapor, now for example syngas, may be stored in a tank such as tank 64. Syngas in holding tank 64 can be returned back to one or more heaters 15, and to the burners in the heaters, to assist in heating chamber 12. The use of syngas for heaters 15 can reduce the need for an outside fuel source for heating chamber 12 by as much as 85%.

Compressed gas may be diverted to conduit 65 leading to a second storage tank 67 that can be used, for example, as a flare gas storage tank. Conduit 68 allows gas stored in tank 67 to be sent to regulator 69a and ultimately from regulator 69a to flare gas burner 15a which provides a unique system for removing non-flammable vapors from the process and monitoring the flammability of the vapors thus allowing a computer control system to instigate the use of these vapors to fire the burners 15.

If desired, an inert gas, such as nitrogen, can be charged into chamber 12 at the beginning and/or at the end of the process. The introduction of an inert gas into the chamber can help protect from explosion, particularly at the beginning of a batch processing cycle. At the end of a batch cycle, as the chamber cools down it can contract. Introduction of an inert gas at the end of the cycle can help maintain a desired vacuum level in the chamber.

The system and process of the present disclosure can, therefore, not only recover the tire black, for example in the form of carbon black, from tires, but also recover the steel in the tires for salvage as well as recover the organics in the tires in the form of light and heavy oils, including, for example, No. 2 to No. 6 fuel oil that may be refined into petroleum products.

The present disclosure is not limited to processing tires. For example, any solid carbon based material such as shoes, plastic, rubber belting, and rubber construction tracks of any size can be processed by the present system and method.

It should also be emphasized that the above-described embodiments of the present disclosure are merely possible examples of implementations set forth for a clear understanding of the principles of the present disclosure. Many variations and modifications may be made to the above-described embodiments without departing substantially from the spirit and principles of the disclosure. All such modifications and variations are intended to be included herein within the scope of this disclosure and protected by the following claims.

The invention claimed is:

1. A method of converting a whole tire comprising the steps of:
   providing a rotatable chamber in which the whole tire can be heated;
   introducing the whole tire into the chamber;
   indirectly heating the chamber;
   rotating the heated chamber with the whole tire in the heated chamber to reduce the whole tire;
   collecting gases or oil or both from the reduced tire from the chamber; and
   collecting residual solids from the reduced whole tire from the chamber;
   wherein the chamber is heated to a temperature between about 350° F. and about 1100° F.
   wherein the whole tire is introduced into the chamber without shredding or cutting the tire.

2. A method of converting a whole tire comprising the steps of:
   providing a rotatable chamber in which the whole tire can be heated;
   introducing the whole tire into the chamber;
   indirectly heating the chamber;
   rotating the heated chamber with the whole tire in the heated chamber to reduce the whole tire;
   collecting gases or oil or both from the reduced tire from the chamber; and
   collecting residual solids from the reduced whole tire from the chamber;
   wherein the chamber is heated to a temperature between about 350° F. and about 1100° F.; and
   wherein the whole tire is introduced into the chamber without pre-treatment of the tire.

3. The method of claim 1, wherein the chamber has an interior surface and the interior surface is provided with a rib system to rotate the whole tire in the chamber and cause a tumbling of the whole tire in the chamber.

4. The method of claim 1, wherein the chamber is heated to a temperature between about 400° F. and about 1050° F.

5. The method of claim 1, wherein the collected gases include one or more of methane, benzene and syngas.

6. The method of claim 1, wherein the collected residual solids include carbon solids.

7. The method of claim 1, wherein the collected residual solids include metal from the tire.

8. The method of claim 1, wherein the chamber is under vacuum.

9. The method of claim 8, wherein the vacuum in the chamber is a negative pressure relative to atmospheric pressure between about 0.2 psi and about 0.5 psi.

10. The method of claim 1, wherein the heating and rotating of the tire in the chamber causes the tire to collapse and liquefy giving off low flash point gases.

11. The method of claim 10, wherein, as the tire liquefies, metal in the tire becomes exposed and aids in breaking down the tire and grinding carbon from the tire into a powder as the tire is tumbled inside the chamber.

12. The method of claim 1, wherein the gases collected include low flash point gases and at least a portion of the low temperature gases is collected and used to heat the chamber.

13. The method of claim 12, wherein the low flash point gases provide up to 85% of the energy needed to heat the chamber and convert a tire.

14. The method of claim 1, wherein the collected residual solids include carbon black that retains its tensile strength.

15. The method of claim 14, further including the step of mixing about 20 percent to about 30 percent of the carbon black with about 70 percent to about 80 percent virgin carbon black to form a carbon black mixture for use in producing tires.

16. The method of claim 1, wherein the gases collected include low flash point gases and low flash point gases are collected, condensed and pressurized to form purified or refined syngas and the syngas is used to heat the chamber.

17. The method of claim 16, further including the step of regulating the syngas used to heat the chamber and supplementing, as needed, with a second fuel to heat the chamber.

18. A system for converting a whole tire comprising:
   a) a rotatable chamber in which the whole tire can be heated including an opening allowing the whole tire to be introduced into an interior portion of the chamber and an outlet through which solids from the whole tire reduced in the chamber can be collected;
   b) a heater for indirectly heating the interior portion of the chamber without cutting or shredding the tire, the heater designed to heat the interior portion of the chamber to a temperature between about 350° F. and about 1100° F.;
   c) a vacuum system including a conduit that is connected to the outlet of the chamber through which solids from the whole tire reduced in the chamber are collected; and
   d) a vapor collection system coupled to the chamber to collect vapor emitted from the whole tire reduced in the chamber, the vapor collection system including a vapor collection chamber in communication with the interior portion of the chamber.

19. The system of claim 18, further including one or more condensers coupled to the vapor collection chamber to receive vapor from the vapor collection chamber and convert the vapor to an oil and one or more storage tanks for storing the oil.

20. The system of claim 19, further including one or more scrubbers coupled to an outlet from the one or more condensers, a compressor for re-pressurizing remaining vapor and refining the remaining vapor to produce purified or refined syngas, and a holding tank for the syngas produced by the compressor.

21. The system of claim 20, further including a system for returning at least a portion of syngas from the syngas holding tank to the heater for heating the chamber.

22. The method of claim 14, wherein the carbon black has a grade of N200 to N700.

* * * * *